May 24, 1966  O. E. ALBERTSON  3,252,896
DISPOSAL TREATMENT OF WASTE LIQUIDS CONTAINING
PUTRESCIBLE ORGANIC MATTER
Filed May 6, 1964  3 Sheets-Sheet 2

INVENTOR.
ORRIS E. ALBERTSON
BY Theodore M. Jablon
ATTORNEY.

May 24, 1966 O. E. ALBERTSON 3,252,896
DISPOSAL TREATMENT OF WASTE LIQUIDS CONTAINING
PUTRESCIBLE ORGANIC MATTER
Filed May 6, 1964 3 Sheets-Sheet 3

INVENTOR.
ORRIS E. ALBERTSON
BY Theodore M. Jablon
ATTORNEY.

United States Patent Office 3,252,896
Patented May 24, 1966

3,252,896
DISPOSAL TREATMENT OF WASTE LIQUIDS CONTAINING PUTRESCIBLE ORGANIC MATTER
Orris E. Albertson, Norwalk, Conn., assignor to Dorr-Oliver Incorporated, Stamford, Conn., a corporation of Delaware
Filed May 6, 1964, Ser. No. 365,241
24 Claims. (Cl. 210—9)

This invention relates to the disposal treatment of waste liquids containing putrescible organic matter. More in particular, this is concerned with the disposal treatment of sewage sludges or the like, by destruction of the organic matter including the floating scum material containing grease and fats. Complete or partial destruction of the organic sludge solids may be effected, for example, by combustion or through a digestion operation.

Sewage sludges are usually derived as so-called underflow from continuously operating sedimentation tanks. This may be a so-called primary clarifier tank to which raw sewage is supplied and from which supernatant liquor overflows for further treatment or disposal.

The resulting settled clarifier sludge containing organic sewage matter must be further concentrated or dewatered in preparation for a combustion operation. For example, a clarifier sludge of from about 3% to about 5% solids content may be subjected to further concentration in a continuously operating sedimentation thickener tank producing an underflow sludge of from about 6% to about 12% solids concentration, while the supernatant liquor overflows. A thickening operation of this kind is described in the patent to Torpey, No. 2,850,449.

Further dewatering of the thickened sludge is possible, for instance, by the application of centrifugal or filtration forces, to a concentration of perhaps 25% to 35%. The thus resulting moist cake material may be subjected to combustion in various ways, one of which is to have the moist cake material undergo a drying operation to further drive off most of the moisture prior to the actual incineration of the organic matter in a suitable combustion chamber or incinerator. An example of a combined sludge drying-and combustion operation is formed in the U.S. patent to Berg, No. 2,171,535. Anaerobic digestion known of itself is another mode of effecting the destruction of the organic matter in the sludge. For example, the thickened sludge may be subjected to such digestion.

Concurrent with the above outlined waste disposal operations there is the ever present and long-standing problem of disposing of the grease and fats normally contained in the sewage. These materials float and collect as scum on the surface of the body of sewage in the settling tanks. A well known skimmer device will sweep this scum into a trap communicating with a deep scum pit provided at the periphery of the tank, wherein it gradually accumulates while the settleable organic sewage matter or sludge is continuously withdrawn from the bottom of the tank. Periodically, when the scum pit is full, the contents must be drawn down and be subjected to a suitable disposal treatment preferably together with the sludge, for instance by combustion or digestion.

The scum fraction thus trapped and collected may be relatively dilute, containing the grease components as well as other organic matter, along with a large quantity of water normally entering the trap. Therefore, as the scum pit fills up, the contents therein will form zones of separation according to respective different specific gravities, namely a bottom zone containing mostly the settleable organic matter, an intermediate zone containing mostly water, and a top zone containing mostly the grease and fats.

If the content of the scum pit being drawn down is sent to the aforementioned combustion station or else to a digester, it may thus periodically upset the desirable and normal conditions under which these disposal stations should operate. In the combustion station, such upsets would occur mainly because of the "slugging" effect due to the sudden introduction of the high caloric grease fraccreate excessive combustion temperatures while requiring sudden changes in the oxygen supply with the risk of incurring temporarily incomplete combustion and consequent odors in the stack gases. In the digestion the upset may be caused by the different digestibility characteristics of the suddenly appearing concentrated grease and fats.

Furthermore, in the past, it was found that pumping the scum from the collecting pit into the digester would tend to produce excessive scum accumulations on the surface of the body of sludge undergoing digestion in the digester tank. Eventually, the scum would build up to a depth of several feet, thus greatly reducing the effective volume of the digester tank. To cope with that problem, various methods for separately handling and disposing of the grease have been employed. For instance, separate special grease combustion units were employed, designed and operated for that special purpose, or the grease was carted away for dumping as land fill or the like rather than the aforementioned load upon the digesters.

According to the invention, the problem of grease handling and disposal above set forth, is met in an extremely simple and effective manner by introducing the previously separated and collected scum or the grease fraction directly into the sludge strata in a respective settling tank. This operation is conducted in such a manner that the scum or grease fraction becomes dispersingly incorporated or entrapped in a relatively large volume of the sludge containing the settled combustible organic matter. Thereby, the aforementioned "slugging" effects and upsets are dissipated and eliminated, allowing the actual destruction of the organic sewage matter including the grease and fats to proceed under desirable and uniform conditions, with the sludge volume acting as a buffer or an equalizer or a cushion.

According to one feature, the grease fraction is introduced periodically into the sludge bed at the tank bottom, for instance in a region spaced from the zone of sludge discharge, while sludge withdrawal itself may proceed at a continuous rate. The grease fraction is introduced or pumped in at a rate slow enough to avoid upward channeling through the bed of sludge.

According to another feature, sludge withdrawal from the tank is interrupted while the grease fraction is introduced at the tank bottom through the sludge withdrawal means itself, thereby permitting existing treatment plants to be converted to embody this invention.

According to still another feature, advantage is taken of the gravitational segregation or zone formations in the contents of the scum pit, by first drawing down the watery non-grease fractions for delivery to the feedwell of a settling tank, and then drawing down the remaining concentrated grease fraction for delivery into the bed of sludge.

In one embodiment of the invention means are provided for pumping at least the grease fraction of the contents of the scum pit of a settling tank directly back into sludge bed of that tank.

In another embodiment, while underflow sludge from one or more clarifier tanks is supplied to the feedwell of a thickener, the grease fraction from the scum pit or pits of those clarifiers is pumped into the deep sludge bed maintainable in the thickener tank, while thickener effluent possibly carrying small amounts of upwardly escaping grease, returns to the raw sewage supply.

In still another embodiment, underflow sludge from a clarifier tank or a plurality of such tanks, as well as the collected scum therefrom are supplied to the feedwell of a sedimentation thickener which in turn has its own scum skimming facilities and scum collecting pit. By thus concentrating the floating scum load from the clarifiers upon the relatively small area of the thickener, the amount of water trapped with the grease will be minimized. The trapped and stored scum or at least the grease fraction thereof is then pumped periodically back into the thickener bed.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 1:
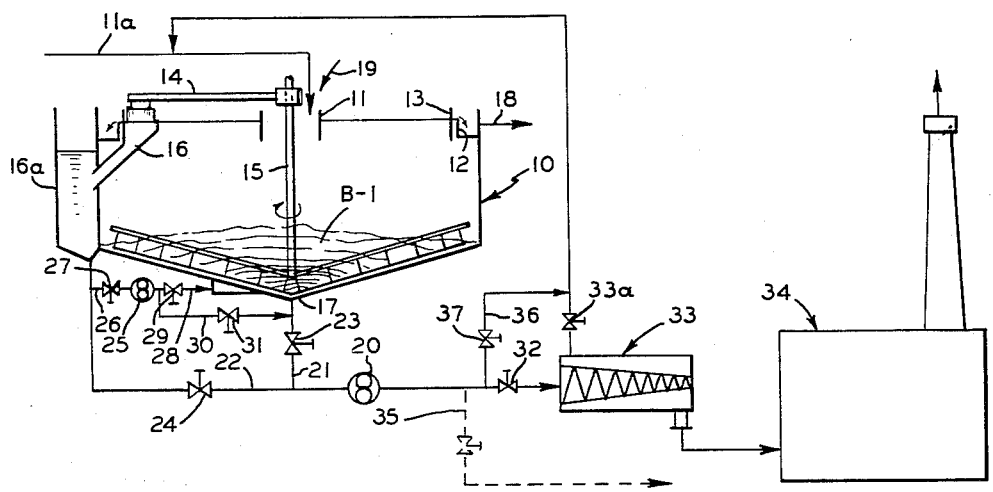
FIG. 1 is a flow sheet illustrating one embodiment of this invention, providing only one sedimentation unit equipped for introducing the scum or grease fraction into the bottom zone of the tank.
Figure 2:
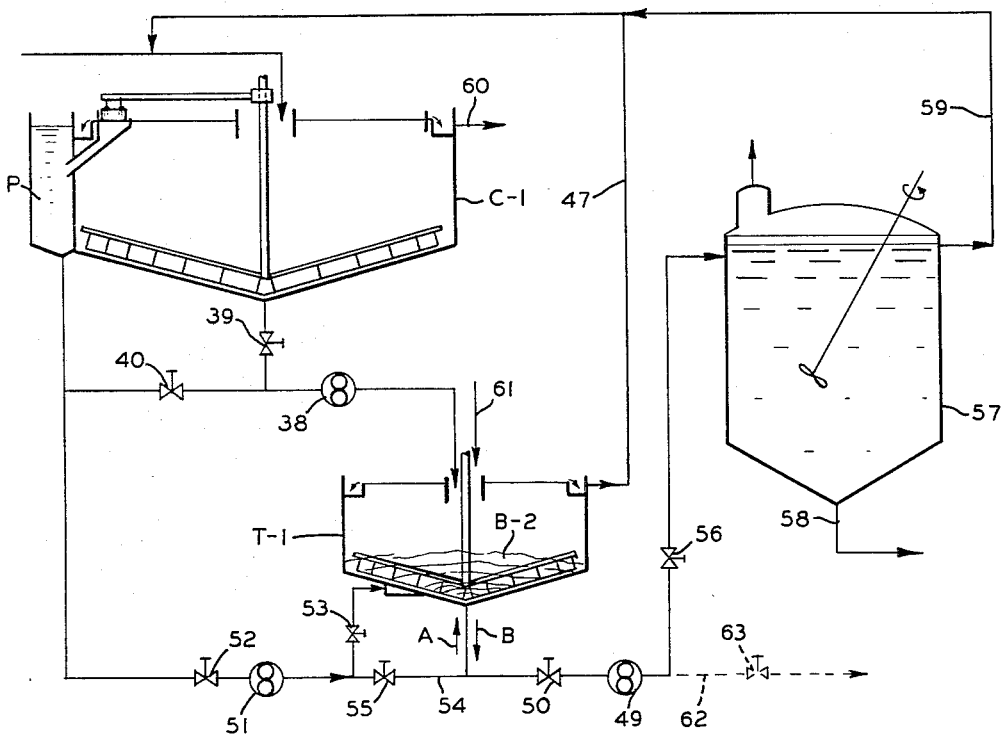
FIG. 2 is a flowsheet illustrating another embodiment providing a combination of one or more clarifier tanks with a sedimentation thickener, equipped for introducing the scum or grease fraction from the clarifiers into the bottom zone of the thickener.
Figure 5:
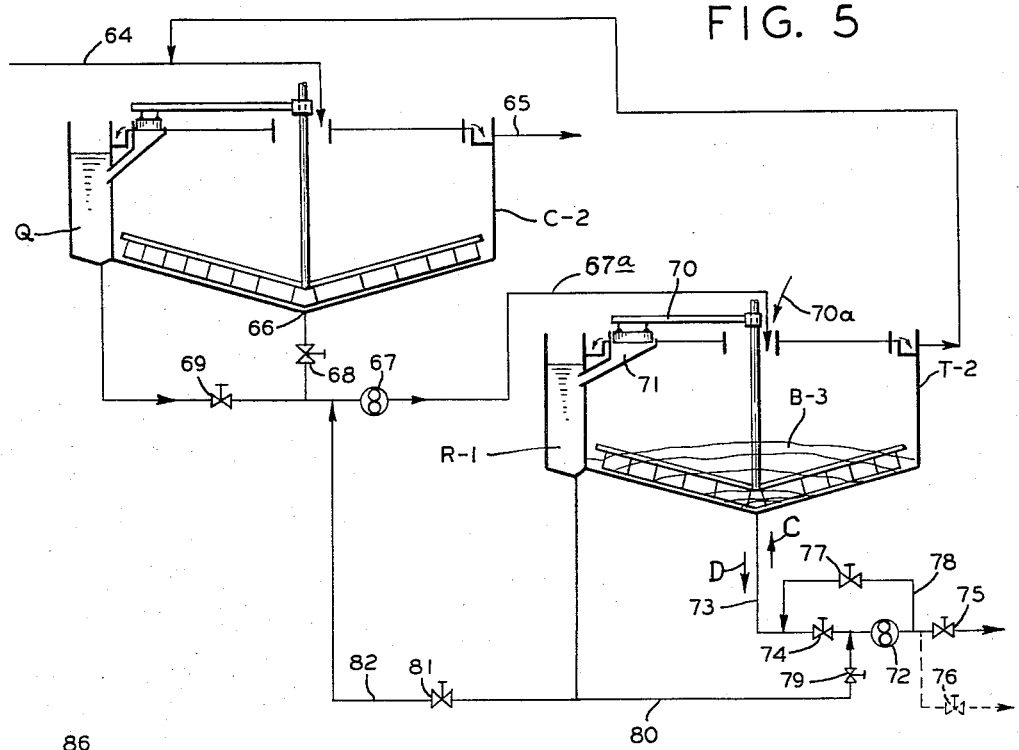
FIG. 5 is a flowsheet illustrating a combination of sedimentation units similar to that of FIG. 2, but with the scum collection consolidated in the thickener, and equipped for introducing the grease fraction through the thickener sludge discharge line.
Figure 6:
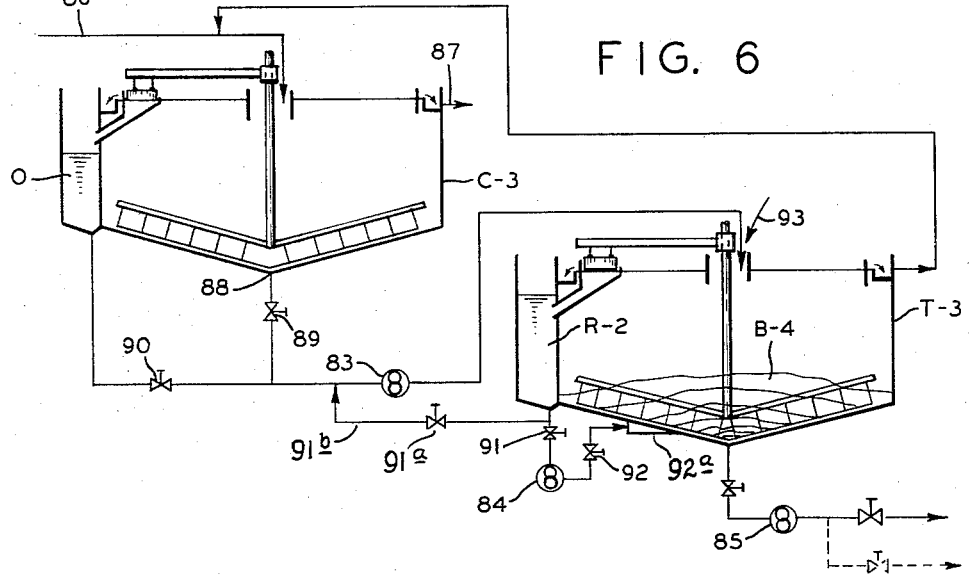
FIG. 6 is a flowsheet illustrating a combination of sedimentation units similar to that of FIG. 5, but equipped for introducing the grease fraction in a bottom zone spaced from the thickener sludge discharge point.

Taking sewage treatment, for example, this invention may be practiced by the operation of a single sedimentation unit, as exemplified in FIG. 1, or by the operation of one or more clarifier tanks delivering their underflow sludge to a sedimenting thickener as in the embodiments of FIGS. 2, 5, and 6. In each instance, the invention is concerned with special arrangements whereby previously separated floating scum material or the grease fraction thereof is introduced into the sludge bed in a respective sedimentation tank in such a manner that the grease becomes dissipated and entrapped in a relatively large volume of sewage sludge. Such dissemination of the high caloric grease into a large volume of sludge of relatively low caloric value, provides a cushion or buffer against the load shocks or the like in the subsequent disposal operation whereby both the organic matter and the grease are subjected jointly to destruction. In each of the various embodiments of such preparatory conditioning treatment of the sewage herein illustrated, the destruction of the sewage matter in the sludge may be effected, for example, by a combustion process or else by way of anaerobic digestion.

In the single tank embodiment of FIG. 1, there is shown a continuous sedimentation tank 10 having a feedwell 11 supplied with waste liquid or sewage 11a, an overflow launder 12, a scum baffle 13 concentric with and spaced inwardly from the launder, and a scum skimming device 14 rotating together with a rotary sludge raking structure 15. A scum trap 16 located adjacent to the scum baffle receives the floating scum moved by the skimmer, for delivery into a scum pit 16a provided marginally of the tank. An example of a scum skimming device and trap is found in U.S. patent to Scott No. 2,611,489.

This settling tank has a conically shaped bottom wherein the sewage sludge may undergo a degree of thickening as indicated by sludge bed B–1, while being kneaded by the blades of the raking structure, and there is a centrally disposed bottom outlet means 17 for sludge discharge. The separated overflowing sewage liquor discharging at 18 may be sent to waste or it may be subjected to any of the forms of conventional secondary aerobic biologic treatment and part or all of the resulting secondary sludge may be supplied to the tank 10 as indicated at 19.

A main pump 20 has a first intake connection 21 with the sludge outlet means 17, and a second intake connection 22 with the bottom of scum pit 16a. Control valve means are provided at the intake side of the pump as exemplified by control valves 23 and 24 in the respective intake connections of the pump. These valves may be manipulated in such a manner that the pump will normally draw underflow sludge alone from the tank until such time that the scum pit will be full or will have accumulated a substantial inventory stratefied into a volume of water and sludge subjacent to a top layer or zone of grease. At that time the valves may be set so that the pump will temporarily draw water alone from the pit, or so that underflow sludge and said subjacent volume of scum material are drawn simultaneously. After the non-grease fraction has thus been drawn down in the pit, the initial valve positions may be restored so the pump will again draw underflow sludge alone.

But then, the remaining grease fraction is pumped separately from the scum collecting pit into the body of sludge bed in the tank. For that purpose there is provided an auxiliary pump 25 of relatively small capacity as compared with pump 20. This auxiliary pump has an intake connection 26 with the bottom of the pit, provided with control valve 27. A discharge connection 28 provided with control valve 29 leads from the auxiliary pump to the tank bottom for delivery of the grease fraction in a region spaced from the sludge outlet means of the tank. With valve 24 closed, and valves 27 and 29 open, the pump 25 will introduce the grease fraction from the pit relatively slowly into the body of sludge, causing the grease to be dispersed therein, even as main pump 20 may continue drawing sludge through valve 23. Then, after the auxiliary pump is stopped and valves 27 and 29 are closed, the pit will again start refilling with scum supplied thereto by the skimming device.

The auxiliary pump 25 is shown to have an alternative discharge connection 30 provided with a control valve 31, leading directly to the sludge outlet means of the tank. Such a connection may be operated by the manipulation of the respective valves.

The main pump 20 in this example delivers the underflow sludge interspersed with the grease, through a control valve 32 to a dewatering station 33 here schematically indicated by a centrifugal machine of the solid bowl type, although for instance a continuous vacuum filter unit or rotary drum filter may also be employed in lieu of the centrifuge. These machines are capable of dewatering the underflow sludge to a solids concentration of from about 25% to about 35% which is the consistency of a moist cake material. Dewatering units per se of this kind are well known.

In the instance of the centrifuge, the conically shaped centrifuge roto bowl delivers from its wide end the separated sewage liquor here shown to return through a control valve 33a to the feed inlet of the tank. The moist cake material is delivered from the narrow end of the rotor impelled by a conically shaped conveyor screw rotating at a differential speed within and relative to the solid rotor bowl, which cake material is then sent to a combustion station 34. A combustion system for moist cake material or the like is exemplified in the patent to Berg No. 2,171,335 wherein the cake material is subjected to a drying operation before being subjected to incineration proper. Other types of combustion systems may be employed.

An alternative connection 35 shown in dotted line indicates that the destructive disposal of the sludge with the grease dispersed and embodied therein, may also be effected by way of anaerobic digestion in a digester tank.

A further discharge connection 36 with control valve 37 from pump 20 bypassing the centrifuge, allows the pump delivery to be shunted directly into the settling tank while pump 20 is drawing down the non-grease or water fraction from pit. This can be arranged by closing valves 32 and 33a, and opening valve 37.

Figure 4:
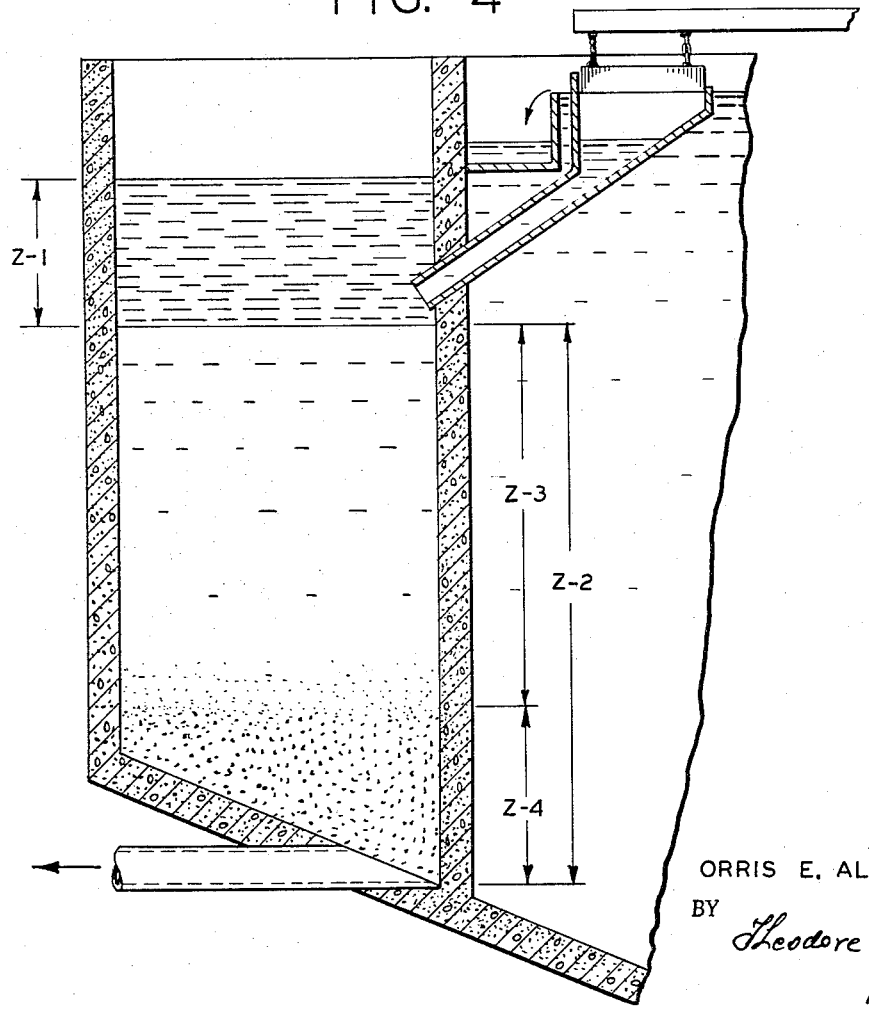
FIG. 4 is a greatly enlarged view of the scum collecting pit of the clarifier tank.

As represented in the embodiments of FIGS. 2, 4, and 5, the invention may be advantageously employed in a sewage treatment operation where dilute underflow sludge from a primary clarifier tank is pumped to a much smaller but highly loaded sedimentation thickener to effect further substantial solids concentration by applying thickening controls such as described in the patent to Torpey No. 2,850,449.

Briefly, according to the thickening operation in that patent, a primary effluent of high quality, that is an effluent carrying a minimum of suspended matter is obtainable from the primary clarifier, when the primary underflow sludge is withdrawn from the clarifier at an exceptionally high dilution, namely after a relatively short detention in the clarifier tank and thus in a relatively unaged or fresh condition so that putrefaction of the sludge solids along with gassing will not occur to affect the quality of the primary effluent. According to this patent, the dilute fresh sludge from the clarifier tank is subjected to a specially controlled thickening operation which involves, besides other control factors, the maintaining of a sludge bed of substantial depth in the thickener, the conjoint effect of these controls being that septicity of the sludge will not occur, even though a high solids concentration is achievable in this bed. With the operating conditions in the clarifier and in the thickener controlled relative to each other in accordance with the teachings of that patent, only a relatively small but highly loaded thickening tank is required, occupying an area which may be only about $\frac{1}{10}$ of the area of the clarifier tank or even less. A plurality of clarifiers may operate to deliver their respective dilute underflow sludges into a single highly loaded thickener operated in the manner taught by said patent. According to the patent, significant economic and operating advantages can be attained, for example, when the thus thickened sludge is subjected, for instance, to a disposal treatment in an anaerobic digester. The primary effluent obtained from the operation controlled in the manner set forth above, may be subjected to any of the modes of conventional aerobic treatment producing a secondary clarifier sludge which may be added to the primary clarifier sludge entering the thickener.

In the embodiment of FIG. 2, the treatment system comprises a clarifier tank C-1 and a thickener T-1. The clarifier may be generally of the kind outlined above in connection with the embodiment of FIG. 1, equipped with an overflow launder for sewage liquor, a skimmer rotating with the rake structure and cooperating with a scum baffle to deliver floating scum into a trap, and a scum collecting pit P receiving the scum and grease from the trap. A pump 38 having intake connections with the bottom outlet of the clarifier tank and with the bottom outlet of the scum collecting pit respectively, may be operated by the manipulation of suitable valve means, such as valves 39 and 40, to draw sludge from the clarifier, or periodically to draw down part of the contents of the collecting pit, or to draw simultaneously from both sources.

Figure 3:
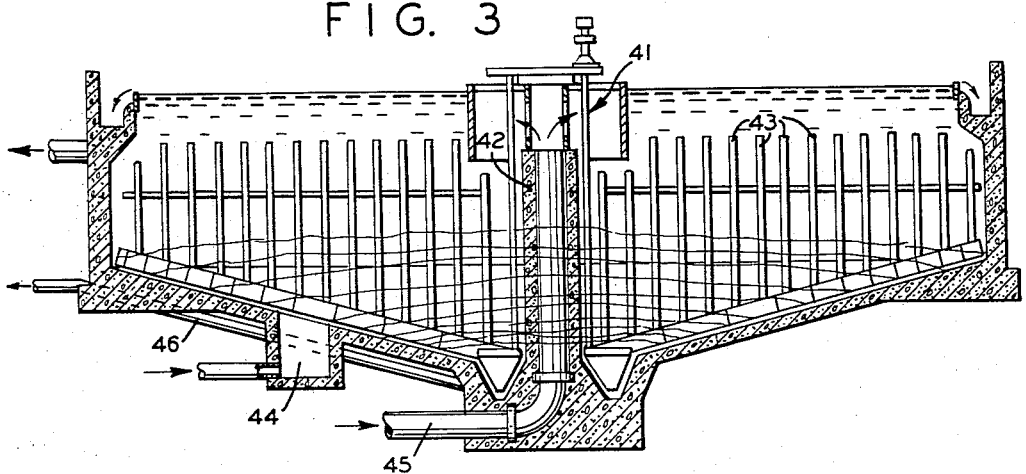
FIG. 3 is a greatly enlarged detail vertical sectional view of an example of a thickener, with inlet means in the bottom for introducing the grease fraction.

Pump 38 delivers dilute sludge from the clarifier and/or scum material from collecting pit P into the thickener T-1. The thickener may be of the kind more fully shown in FIG. 3, equipped with a rake structure 41 rotatably supported upon a center pier 42. More particularly, this rake structure is shown to be additionally provided with rows of vertical thickening rods 43 or the like. Furthermore, the bottom of this tank is provided with a special recess 44 spaced from the central sludge discharge, for introducing the grease fraction from the clarifier scum collecting pit P into the bed B-2 of thickened sludge. The feed to this thickener is supplied through a conduit 45 rising through the center pier. Thickened sludge is withdrawn from an annular sump around the footend of the pier through a withdrawal pipe 46.

In the operation of this thickener (see FIG. 2), the effluent may be returned to the clarifier via a connection 47, while a pump 49 through control valve 50 draws thickened sludge from the bottom of the tank.

Pump 38 may operate continuously to supply clarifier sludge to the thickener, except for periods when valve 39 is closed and valve 40 is opened for the purpose of drawing down the subjacent non-grease or water-sludge fraction from the clarifier collecting pit. Then, after closing valve 40 and again opening valve 39, a pump 51 may be operated to draw the remaining grease fraction or the like from the clarifier collecting pit through a control valve 52, for delivery through a control valve 53 into the sludge bed of the thickener in a region spaced from the central sludge discharge, which region corresponds to the aforementioned bottom depression 44 of the thickener shown in FIG. 3 receiving previously collected grease from the pit. During this period of grease introduction into the thickener, the pumps 38 and 49 may continue to operate drawing sludges from the clarifier and from the thickener respectively. Pump 51 will be stopped and the associated valves 52 and 53 closed at the end of the grease withdrawal period whereupon the clarifier scum collecting pit will refill with scum.

An alternate discharge connection 54 with control valve 55 connects pump 51 directly with the thickener sludge outlet means. In this way there is provided an alternate mode of introducing the grease fraction from the clarifier collecting pit into the sludge bed of the thickener, an arrangement applicable to an existing tank. Thus, if we consider the connection through valve 53 closed or non-existent, but valve 55 open and valve 50 closed, then pump 51 may introduce the grease fraction in the direction indicated by arrow A until it in turn is stopped, at which time the sludge discharge pump 50 may resume sludge withdrawal in the opposite direction indicated by arrow B.

The scum collecting pit P of the clarifier in FIG. 2, or of any of the settling tanks in any of the other embodiments, collects a scum inventory consisting of grease, water and sludge, that must be drawn down periodically to make room for refill. As illustrated in FIG. 4 the scum collected in the pit will stratify according to specific gravities into a top zone Z-1 containing mostly grease, and a subjacent non-grease zone Z-2 which in turn comprises an intermediate zone Z-3 containing mostly water, and a bottom zone Z-4 containing settled sewage solids or sludge.

Pump 49 may deliver the mixture of thickened sludge and interspersed grease through a control valve 56 into an anaerobic digester 57 wherein the digestible matter including the grease is destroyed through bacterial conversion into gas. A residual substantially inoffensive digester sludge resulting from this digestion is drawn from the digester tank as indicated at 58, while digester supernatant liquor if any may, via line 59, return for retreatment to the clarifier. Clarifier effluent liquor 60 may be subjected to any of the forms of conventional aerobic biologic treatment known as secondary treatment, and the resulting secondary clarifier sludge returned to the thickener as indicated at 61. As an alternative to digestion a discharge connection 62 (in dotted line) for pump 49 may carry the sludge through a control valve 63 to a combustion system such as indicated in FIG. 1.

The embodiments in FIGS. 5 and 6 while comprising a clarifier delivering thin sludge to a thickener, differ from the embodiment in FIG. 2 mainly in that the thickener is equipped with its own skimming and scum collecting means similar to those of the clarifier. With that arrangement, the thickener may periodically receive all of the accumulated scum material from the scum pit of the clarifier or from a plurality of clarifiers. The transferred scum is then collected from the much smaller area of the thickener into the scum collecting pit of this thickener, at a more uniform and relatively higher concentration. The thickener then periodically disposes of this scum inventory as the grease fraction is dispersingly introduced into the bed B-3 of thickened sludge.

Referring to FIG. 5, a clarifier C-2 equipped substantially similar to the one in FIG. 2, has sewage or the like feeding in at 64, supernatant sewage liquor discharging at 65, thin clarifier sludge conveyed by the rake structure discharging at 66, while scum inventory containing grease builds up in the scum pit due to the cooperation of the rotating skimmer with the trap.

This clarifier has a pump 67 drawing thin clarifier sludge through control valve 68, and drawing down the scum inventory through control valve 69 from the collecting pit Z, and delivering them to the thickener T-2. By the manipulation of the valve means, pump 67 may be allowed to transfer thin clarifier sludge continuously to the thickener, or thin sludge or scum inventory may be transferred simultaneously, or they may be transferred separately. The thickener which may be generally similar to the one in FIG. 2, is additionally equipped with scum skimmer 70, scum trap 71, and scum pit R-1 receiving the scum including grease due to the cooperation of the skimmer with the trap.

A pump 72 serving the thickener draws thickened sludge through intake line 73 and control valve 74 for delivery through control valve 75 to a combustion station such as exemplified in FIG. 1, or through a control valve 76 (in dotted line) to a digester as exemplified in FIG. 2. During this period of sludge withdrawal, a control valve 77 in a flow connection 78 and a control valve 79 in a flow connection 80, and also a control valve 81 in a connection 82 are closed, while transfer of thin sludge to the thickener by pump 67 may continue. But when an inventory of scum material has built up in the collecting pit R-1, stratified as shown in FIG. 4, the sludge withdrawal from the clarifier is interrupted by closing the valves 68 and 69, while valve 81 is opened, to allow the clarifier pump 67 to draw down the subjacent non-grease fraction from the scum collecting pit R-1 for delivery through line 67a into the feedwell of the thickener.

After this is done, valve 81 is again closed, while the clarifier valves are manipulated to allow pump 67 to resume transfer of thin clarifier sludge to the thickener.

But then, in order to introduce the remaining grease fraction from collecting pit R-1 into the bed B-2 of thickened sludge, the thickener valves are manipulated so that the normal thickened sludge withdrawal in the direction of arrow C is interrupted, and instead the grease fraction is transferred into the sludge bed through the sludge withdrawal line in the direction of arrow D. After the grease fraction has become intermixed with the thickened sludge in the bed, these valves are again manipulated to allow pump 72 to resume its normal sludge withdrawal operation. In other words, during normal sludge withdrawal, valves 77, 79 and 81 are closed, while valves 74 and 75 are open, but during transfer of the grease fraction, the valves 74 and 75 are closed, while valves 77, 79 and 81 are open.

Thickener effluent may be returned to the clarifier, and thickened sludge from the thickener may be sent to disposal as by combustion or by digestion as was previously indicated. Secondary clarifier sludge resulting from secondary aerobic biologic treatment of primary clarifier effluent, may be returned to the thickener as is indicated at 70a.

In the embodiment of FIG. 6, a clarifier C-3 delivers thin sludge to a thickener T-3, both units being equipped similar to those in FIG. 5, and having respective scum collecting pits O and R-2.

However, in FIG. 6 an additional pump is included in the system, providing three pumps 83, 84 and 85. By this arrangement, pump 85 may be allowed to draw thickened sludge uninterruptedly, while pump 84 transfers the grease fraction from pit R-2 into the thickener sludge bed B-4 independently of the operation of pump 85. Meanwhile pump 83 may normally continue to transfer clarifier sludge and/or scum to the thickener, except when this pump is employed, after manipulation of the proper valves, to draw down the subjacent non-grease fraction from the collecting pit R-2 for delivery into the thickener.

The operation of the FIG. 6 embodiment more in detail is as follows:

The clarifier C-3 equipped substantially the same as the one in FIG. 1, has sewage or the like feeding in at 86, supernatant sewage liquor discharging at 87, thin clarifier sludge conveyed by the rake structure discharging at 88, while scum inventory containing grease builds up in the scum pit R-2 due to the cooperation of the skimmer with the trap.

Pump 83 normally draws thin sludge from the clarifier through control valve 89, or draws scum material through control valve 90, from collecting pit O or it may draw both simultaneously, for delivery to the thickener T-3.

The thickener T-3 is equipped with its own scum collecting means, and also with separate means for introducing the grease fraction from the collecting pit R-2 into the sludge bed in a region spaced from the sludge withdrawal means. The pump 85 is operable for continuously drawing thickened sludge for delivery either to a combustion station such as exemplified in FIG. 1, or to a digestion station such as exemplified in FIG. 2. The pump 84 is operable whenever need be, to independently transfer the grease fraction from collecting pit R-2 through control valves 91 and 92 into the sludge bed of the thickener by entering the sludge bed independently in the region 92a spaced from the sludge outlet means. Pump 83 normally transfers thin sludge and/or scum material from pit O for delivery to the thickener. But this delivery may be interrupted by closing valves 89 and 90 as well as valve 90a in cross-over conduit 90b for the short period of time that it takes pump 83 to draw down the subjacent non-grease fraction from pit R-2 for return into the sludge bed B-4 of the thickener, while pump 84 is rendered inactive with valves 91 and 92 closed. After this is done, the appropriate valves may again be manipulated to allow pump 83 to resume the sludge withdrawal from the clarifier and to allow pump 84 again to operate as above indicated. Effluent from the thickener may be sent back to the clarifier, while secondary clarifier sludge derived by secondary aerobic biologic treatment of the primary effluent liquor may be supplied to the thickener as is indicated at 93.

In summary, grease dispersal into the sludge bed in the embodiment of FIG. 1 may be conducted, for instance, with an ample sludge sump provided in the clarifier and operated to effect thickening. If a separate thickener is provided to receive the thin clarifier sludge, according to embodiment of FIG. 2, then the scum or grease fraction collected from the clarifier may be introduced into a deep sludge bed of the thickener which thickener is indicated to be of substantially smaller size than the clarifier. But if the thickener has its own scum collecting facilities as in the embodiments of FIG. 5 and 6, then the collected scum from the storage pit of the clarifier may be all fed into the thickener which in turn is operated for collecting and introducing the scum or grease fraction into its own bed of sludge. The introduction and dispersal of the scum or grease fraction into the sludge bed in any of the foregoing embodiments, may be effected in various ways some of which are illustrated to comprise means for effecting such introduction either through an existing sludge discharge connection or through separate induction means into the sludge zone that is being kneaded by the raking blades. In the operation of the invention, the scum or respective scum fraction is preferably introduced into the thickened sludge at a slow rate and otherwise under conditions favorable for effecting the dispersal and entrapment of the grease into the sludge. The thus conditioned sludge mixture, avoiding a separate grease disposal system or operation, provides a substantially homogenized sludge for disposal, be it through combustion or through digestion.

The introduction of the scum or grease fraction into the sludge bed may be through the existing sludge discharge connection, or through induction means separate therefrom. The separate induction means may be provided at the bottom. But an alternative mode of introduction is from the top through the hollow shaft of the rake structure and through suitable outlets or outlet conduit means at the lower end thereof.

It will be understood that each of the elements described above or two or more together may also find a useful application in other types of waste disposal systems differing from the ones described above.

While the invention has been illustrated and described as embodied in a sludge treatment system comprising the thickening of thin sewage sludge, it is not intended to be limited to the details shown, since various modifications and structural as well as operational changes may be made without departing in any way from the spirit of the present invention.

I claim:

1. The method of treating waste such as sewage or the like containing settleable organic matter as well as non-settleable scum material including grease, which comprises maintaining a body of said waste liquid for continuous sedimentation thickening to maintain therein a subjacent bed of thickened sludge in a bottom zone and a superjacent zone of supernatant liquor as well as floating scum material; feeding said waste to said body while supernatent liquor overflows and floating scum material forms on the surface, skimming the floating scum into a collecting zone and allowing a grease fraction to form at the top of said collecting zone and superjacent to a substantially non-grease fraction, periodically separately removing the grease fraction and the non-grease fraction, introducing and dispersing the grease fraction into said zone of thickened sludge, discharging the resulting sludge mixture from said bottom zone, and subjecting said withdrawn mixture to treatment effecting the destruction of said organic matter and said grease.

2. The method of continuously treating sewage containing settleable organic solids as well as non-settleable scum material including grease, which comprises subjecting such sewage to clarification by sedimentation in a clarifier tank to yield a superjacent body of liquor for effluent from the clarifier tank and a subjacent stratum of sludge, as well as scum material floating on the surface, feeding said sewage to said clarifier tank while supernatant liquor overflows, and floating scum material forms on the surface of said body, removing floating scum material and separately collecting the same, withdrawing sludge from said subjacent stratum, feeding said clarifier sludge to a sedimenting thickener to yield therein a superjacent body of liquor for effluent from the thickener and a subjacent bed of thickened sludge, introducing at least the grease fraction of said collected clarifier scum material into said bed of thickened sludge so that the resulting mixture has the scum material incorporated and dispersed therein, withdrawing said mixture from said bed of sludge, returning said effluent to said clarifier for retreatment, and subjecting said mixture to a treatment whereby said organic matter and grease are destroyed.

3. The method of continuously treating sewage containing settleable organic solids as well as non-settleable scum material including grease, which comprises subjecting such sewage to clarification by sedimentation in a clarifier tank to yield a supernatant body of liquor for effluent from the clarifier tank and a subjacent stratum of sludge, as well as scum material floating on the surface, feeding said sewage to said clarifier tank while supernatant liquor overflows, and floating scum matrial forms on the surface of said body, removing floating scum material and separately collecting the same, withdrawing sludge from said subjacent stratum, feeding said clarifier sludge to a sedimenting thickener to yield therein a superjacent body of liquor for effluent from the thickener and a bed of thickened sludge, feeding said collected clarifier scum material to said thickener to again yield floating scum material, skimming and trapping said thickener scum material and collecting the same, introducing at least the grease fraction of said collected thickener scum material into said bed of thickened sludge so that the resulting mixture has the scum material incorporated and dispersed therein, withdrawing said mixture from said bed of sludge, and subjecting said mixture to a treatment whereby said organic matter and grease are destroyed.

4. Apparatus for the treatment of waste such as sewage or the like containing settleable organic matter as well as non-settleable scum material including grease, which comprises a continuously operating sedimentation tank adapted for the collection of a bed of thickened sewage sludge in a bottom thickening zone, and provided with feed supply means for said waste, overflow means for supernatant liquor, discharge means for withdrawing thickened sludge from said thickening zone, means for feeding said waste liquid to said tank while supernatant liquid overflows, a scum collecting pit provided adjacent to said tank, means for collecting scum material into said pit so that a grease fraction forms at the top, means for periodically separately removing the grease fraction and the subjacent substantially non-grease fraction from said pit, means for introducing the grease fraction into said bed of thickened sludge so as to be incorporated and dispersed therein, and disposal means for effecting the destruction of said organic matter and of said grease in the sludge withdrawn from said thickening zone.

5. The apparatus according to claim 4, wherein said disposal means comprise a mechanical dewatering station receiving said mixture from said tank and effecting the separation thereof into a liquor and a dewatered product in the form of moist cake material, and a combustion station for effecting the destruction of said organic matter and of the grease entrapped therein.

6. The apparatus according to claim 4, wherein said disposal means comprise an anaerobic digester station receiving said mixture from said tank.

7. Apparatus for the treatment of sewage or the like containing settleable organic matter as well as non-settleable scum material including grease, which comprises a continuously operating sedimentation tank provided with feed supply means for said sewage, overflow means for supernatant sewage liquor, and discharge means for withdrawing sewage sludge from a bottom zone, a scum collecting pit provided marginally of said tank, means for collecting scum material into said pit, a first pump having a first intake connection with said sludge discharge means, and having a second intake connection with the bottom of said collecting pit, and having an outlet connection leading away from said tank, valve means for controlling the withdrawal of sludge and of scum, respectively, by said pump; a second pump having an intake connection with the bottom of said collecting pit, and having a discharge connection with the tank bottom, and valve means for controlling the transfer of the contents of the collecting pit into the bottom zone in said tank by said second pump, said various valve means being controllable to normally allow sludge to be withdrawn by said first pump while scum material accumulates in said collecting pit, and also to draw from said collecting pit a substantially non-grease fraction, and thereafter to allow said second pump to draw the remaining grease fraction from said pit for delivery into said bottom zone in the tank, and disposal means for effecting the destruction of said organic matter and of said grease in the sludge withdrawn from said zone.

8. The apparatus according to claim 7, wherein said discharge connection of the second pump leads to a region of the tank bottom spaced from said sludge discharge means.

9. The apparatus according to claim 7, wherein said discharge connection of the second pump leads to said sludge discharge means for introducing scum material therethrough into the bottom zone within the tank while sludge withdrawal therethrough is interrupted.

10. Apparatus according to claim 7, with the addition of a discharge connection for said first pump leading to the feed supply means of said tank, and control valve means, operable in such a manner that the discharge connection is closed when the outlet connection is open and vice versa.

11. Apparatus for the treatment of sewage or the like containing settleable organic solids as well as non-settleable scum material including grease, which comprises a continuously operating sedimentation tank provided with feed supply means for the sewage overflow means for supernatant sewage liquor, and discharge means for withdrawing sludge from a bottom zone, a scum collecting pit provided marginally of the tank, means for collecting scum material into said pit, a first pump having a first intake connection with said sludge discharge means and having a second intake connection with the bottom of said collecting pit, and valve means for controlling the rate of withdrawal of sludge and of scum material respectively, a continuously operating sedimenting thickener provided with feed supply means for the sludge delivered thereto by said first pump, overflow means for supernatant liquor, and discharge means for withdrawing thickened sludge contained in the bottom zone, a second pump having an intake connection with said discharge means for the thickened sludge, and control valve means for said pump, a third pump having an intake connection with the bottom of said collecting pit, and a discharge connection with the bottom of said thickener, and control valve means for said pump, said various control valve means being operable to normally allow the first pump to supply clarifier sludge to said thickener while scum material accumulates in said collecting pit of the clarifier, and to draw from the accumulated scum material a substantially non-grease fraction for delivery to said thickener, while allowing the second pump to draw thickened sludge, and to allow said third pump to draw from the pit the remaining grease fraction for delivery into the bottom zone in said thickener, and disposal means for effecting the destruction of said organic matter and of said grease in the sludge withdrawn from said tank.

12. The apparatus according to claim 11, wherein said discharge connection for said third pump leads to a region of the thickener bottom spaced from said sludge discharge means.

13. The apparatus according to claim 11, wherein said discharge connection for the said third pump leads to said sludge discharge means of the thickener.

14. Apparatus for the treatment of sewage or the like containing settleable organic solids as well as non-settleable scum material including grease, which comprises a continuously operating sedimentation tank provided with feed supply means for the sewage, overflow means for supernatant sewage liquor, and discharge means for withdrawing sludge from a bottom zone, a scum collecting pit provided marginally of the tank, means for collecting scum material into said pit, a first pump having a first intake connection with said sludge discharge means, and having a second intake connection with the bottom of said collecting pit, and valve means for controlling the withdrawal of sludge and of scum material, respectively, by said pump; a continuously operating sedimenting thickener provided with feed supply means for the sludge delivered thereto by said first pump, overflow means for supernatant liquor, and discharge means for withdrawing thickened sludge contained in the bottom zone; a scum collecting pit provided marginally of the thickener, means for collecting scum material into said pit, a second pump having a first intake connection with said thickened sludge discharge means, a second intake connection with the bottom of said thickener scum collecting pit, and valve means for so controlling the flow through said two intake connections in such a manner that when the one connection is open the other one is closed and vice versa, said second pump further having a first discharge connection leading to said thickened sludge discharge means, and a second discharge connection leading away from the thickener, and valve means operable so that when the one discharge connection is closed, the other one is open and vice versa, said various valve means being operable to normally allow said first pump to supply clarifier sludge to said thickener while scum material accumulates in said collecting pit of the clarifier, and also to draw scum material from said collecting pit for delivery to said thickener, while allowing said second pump to draw thickened sludge while scum material accumulates in the collecting pit of the thickener, and alternatively to draw scum material from said thickener pit for delivery into the bottom zone of said thickener, while said sludge withdrawal is interrupted, and disposal means for effecting the destruction of said organic matter and of said grease in the sludge withdrawn from said tank.

15. The apparatus according to claim 14, with the addition of a third intake connection for said first pump leading to the bottom of the thickener collecting pit, and control valve means operable while open to allow said first pump to draw a substantially non-grease fraction from the thickener collecting pit for return into the thickener, while said second intake connection of said second pump is closed.

16. The apparatus according to claim 14 wherein means are provided for delivering said scum material through said thickened sludge discharge means into said bottom zone of the thickener.

17. Apparatus for the treatment of waste liquid containing settleable organic matter as well as non-settleable scum material including grease, which comprises a continuously operating sedimentation tank provided with feed supply means for said waste liquid, overflow means for supernatant sewage liquor, and discharge means for withdrawing sewage sludge from a bottom zone, a scum collecting pit provided marginally of said tank, means for collecting scum material into said pit, a pump having a first intake connection with said sludge discharge means, a second intake connection with the bottom of said scum collecting pit, and valve means for so controlling said two intake connections that when the one is open the other one is closed and vice versa, said pump further having a first discharge connection leading to said sludge discharge means, and having a second discharge connection leading away from said sedimentation tank, and valve means so operable that when the one discharge connection is closed, the other one is open and vice versa, both said valve means being operable to draw sludge while scum material accumulates in said collecting pit, and alternatively to draw scum material from said pit for delivery into the bottom zone of said tank while said sludge withdrawal is interrupted, and disposal means for effecting the destruction of said organic matter and of said grease in the sludge withdrawn from said tank.

18. The apparatus according to claim 17, wherein means are provided for delivering said scum material through said sludge discharge means into said bottom zone of said tank.

19. Apparatus for the treatment of sewage or the like containing settleable organic solids as well as non-settleable scum material including grease, which comprises a continuously operating sedimentation tank provided with feed supply means for the sewage, overflow means for supernatant sewage liquor, and discharge means for withdrawing sludge from a bottom zone, a scum collecting pit provided marginally of the tank, means for collecting scum material into said pit, a first pump having a first intake connection with said sludge discharge means, a second intake connection with the bottom of said collecting pit, and valve means for controlling the withdrawal of sludge and of scum material respectively, a continuously operating sedimenting thickener provided with feed supply means for the sludge delivered thereto by said first pump, overflow means for supernatant liquor, and discharge means for withdrawing thickened sludge from a bottom zone, a scum collecting pit provided marginally of the thickener, means for collecting scum material into said pit, a second pump having an intake connection with said thickened sludge discharge means for withdrawing sludge, a third pump having an intake connection with the bottom of said thickener collecting pit, a discharge connection with the thickener for introducing scum material from said collecting pit into the bottom zone of the thickener and disposal means for effecting the destruction of said organic matter and of said grease in the sludge withdrawn from said tank.

20. The apparatus according to claim 19, wherein means are provided for introducing said scum material into said bottom zone of the thickener in a region spaced from said sludge discharge means.

21. Apparatus for the treatment of sewage or the like containing settleable organic solids as well as non-settleable scum material including grease, which comprises a continuously operating sedimentation tank provided with feed supply means for the sewage, overflow means for supernatant sewage liquor, and discharge means for withdrawing sludge from a bottom zone, a scum collecting pit provided marginally of the tank, and means for collecting scum material into said pit, a first pump having a first intake connection with said sludge discharge means, a second intake connection with the bottom of said collecting pit, and valve means for controlling the withdrawal of sludge and of scum material, respectively, a continuously operating sedimentation thickener provided with feed supply means for the sludge delivered thereto by said first pump, overflow means for supernatant liquor, and discharge means for withdrawing thickened sludge from a bottom zone, a scum collecting pit provided marginally of the thickener, means for collecting scum material into said pit, a second pump having an intake connection with said thickened sludge discharge means for withdrawing sludge, a third pump having an intake connection with the bottom of said thickener collecting pit, a discharge connection with the thickener for introducing scum material from said collecting pit into the bottom zone of the thickener, a third intake connection for said first pump leading to the bottom of said thickener collecting pit, valve means cooperatively associated with said third pump and said second pump, operable in such a manner that when said intake connection for the third pump is open, said third intake connection for the first pump is closed and vice versa, thereby to allow said first pump to draw down a non-grease fraction from said thickener collecting pit for delivery to said thickener while delivery by said third pump is closed, and to allow said third pump to deliver the grease fraction from said pit while said third intake connection of the first pump is closed, and disposal means for effecting the destruction of said organic matter and of said grease in the sludge withdraw from said tank.

22. The apparatus according to claim 21, wherein means are provided for introducing said scum material into said bottom zone of the thickener in a region spaced from said sludge discharge means.

23. Apparatus for the treatment of sewage or the like containing settleable organic solids as well as non-settleable scum material including grease, which comprises a continuously operating sedimentation tank provided with feed supply means for the sewage, overflow means for supernatant sewage liquor, and discharge means at the bottom for withdrawing sludge, a scum collecting pit provided marginally of the tank, means for collecting scum material into said pit, a feed supply pump for said tank, having a first intake connection and control valve means therefor, and a second intake connection with the bottom of said collecting pit, and control valve means therefor, a second pump having an intake connection, with said sludge discharge means for withdrawing sludge, a third pump having a first intake connection with the bottom of said collecting pit, a discharge connection with said tank for introducing scum material from said collecting pit into the bottom zone of the tank, and valve means for controlling the flow of scum material to said tank, said various valve means being operable so as to allow said first pump to draw down a non-grease fraction from said collecting pit for delivery into said tank, while the delivery from said third pump is closed, and to allow said third pump to deliver the grease fraction while said further intake connection of the first pump is closed, and disposal means for effecting the destruction of said organic matter and of said grease in the sludge withdrawn from said tank.

24. The apparatus according to claim 23, wherein means are provided for introducing scum material into said bottom zone of the tank in a region spaced from said sludge discharge means.

References Cited by the Examiner

UNITED STATES PATENTS 2,277,053   3/1942   Alexander et al. _____ 210—194
2,360,811  10/1944   Kelly et al. _____ 210—8
2,897,149   7/1959   Griffith _____ 210—13 X

OTHER REFERENCES

Haseltine, Digestion of Activated and Primary Sludge at Salinas, Calif., Sewage Works Journal, October 1931, vol. 3, pp. 599–614, pp. 600–603 particularly relied on.

MORRIS O. WOLK, *Primary Examiner.*

MICHAEL E. ROGERS, *Examiner.*